United States Patent [19]

Akesson et al.

[11] 4,157,681

[45] Jun. 12, 1979

[54] MACHINE FOR PARING VEGETABLES OR FRUITS

[75] Inventors: Yngve R. Akesson, Hälsingborg; Bror F. Lundgren, Bjuv, both of Sweden

[73] Assignee: Produits Findus S.A., Vevey, Switzerland

[21] Appl. No.: 854,634

[22] Filed: Nov. 25, 1977

[30] Foreign Application Priority Data

Nov. 29, 1976 [CH] Switzerland ............. 14979/76

[51] Int. Cl.² .............................................. A47J 23/00
[52] U.S. Cl. ................................... 99/538; 99/541
[58] Field of Search ........................... 99/538–541, 99/543, 545, 546, 547

[56] References Cited

U.S. PATENT DOCUMENTS

| | | | |
|---|---|---|---|
| 3,396,766 | 8/1968 | Perkins | 99/547 |
| 3,738,257 | 6/1973 | Manfre et al. | 99/547 |
| 3,754,470 | 8/1973 | Console | 99/538 |

*Primary Examiner*—Leonard D. Christian
*Attorney, Agent, or Firm*—Watson, Leavenworth, Kelton & Taggart

[57] ABSTRACT

A machine for paring vegetables, fruits or parts thereof having as their base a central portion to be separated over a hemispherical or ogival surface from the surrounding portion, said machine comprising a tray which pivots discontinuously and which is provided with a recess in which said vegetable or fruit is placed, a blade which is curved towards the vertical axis of said vegetable or fruit, rotates about said axis and moves over an arc of a circle which is convex in relation to said axis between two positions, said positions being a position where it is retracted from said recess and a cutting position.

8 Claims, 5 Drawing Figures

MACHINE FOR PARING VEGETABLES OR FRUITS

This invention relates to a machine for paring vegetables or fruits.

More particularly the invention relates to a machine for paring vegetables, fruits or parts thereof having at their base a central portion to be separated along a hemispherical or ogival surface from the surrounding portion, and placed in a recess in a tray which pivots discontinuously.

Machines for paring vegetables and particularly for separating the flowers or leaves from the stalks supporting them are already known. The vegetables are placed with their heads uppermost in recesses in a tray which pivots discontinuously. A circular blade of invariable diameter is moved towards the head of for example a cauliflower or the head of the cauliflower is moved against a blade of this type which proceeds along a cylindrical cutting surface instead of being adapted to the natural contraction of the stalk from the bottom to the top of the cauliflower; the blade does not separate the flowers at the top, but it destroys those near the top in passing and is likely to separate those near the bottom of the cauliflower badly.

The present invention overcomes the disadvantages mentioned above. Of course, use of the machine according to the invention is not restricted to the paring of cauliflower heads although these are constantly used as examples in the following description.

The machine according to the invention may, in fact, be used for any vegetables, fruits or parts thereof having a central portion to be separated from the surrounding portion along a hemispherical or ogival surface. All sorts of vegetables of the cabbage or lettuce type are to be considered as well as fruits such as pineapples (the central portion of which is removed in the preserving industry) or halves of grapefruits or other citrus fruits in which the pulp is removed from the peel.

The present invention provides a machine for paring vegetables, fruits or parts thereof having at their base a central portion to be separated over a hemispherical or ogival surface from the surrounding portion, the machine comprising a tray which pivots discontinuously and which is provided with a recess in which the vegetable, fruit or part thereof is placed, a blade which is curved towards the vertical axis of the vegetable or fruit, rotates about this axis and moves over an arc of a circle which is convex in relation to this axis between two positions, these being a position where it is retracted from the recess and a cutting position.

The blade may be made to move between these two positions particularly by connecting it to a pivot located close to the axis as in the embodiment described below by way of example.

In the preferred embodiment described in detail below, the machine also comprises a device for the radial adjustment of the blade which is controlled by a device for detecting the size since this is likely to vary considerably in the case of cauliflower heads which are taken as an example.

The drawings illustrate the preferred embodiment in which.

Figure 1:
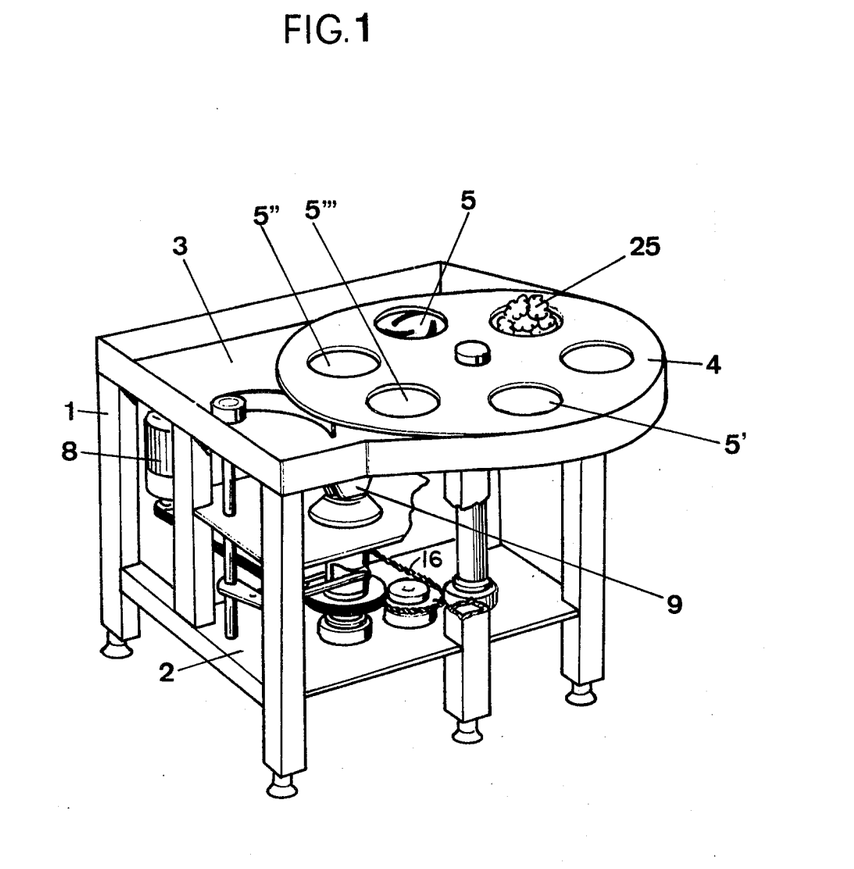
FIG. 1 is a general view in perspective of the machine according to the invention, in a partial section.

As shown in the general view in FIG. 1, the machine consists of a tubular frame 1 provided with a floor 2 and a table 3 which projects beyond the frame on one side. This projection corresponds to the projection of a pivoting tray 4 arranged above the stationary table 3. The tray 4 contains six recesses formed by the same number of circular spaces 5 made in the tray. In FIG. 1, the position 5' corresponds to the feed position of one of these recesses the position 5" to the cutting position and the position 5''' to the discharge position. Each recess in turn receives a cauliflower head at position 5' and carries it along during rotation. FIG. 1 only shows a single cauliflower head 25; another recess shows clearly the arms forming part of the device for fixing the cauliflower heads shown in detail in FIG. 3.

The drive chain 16 shown in FIG. 1 positions the device for discontinuously rotating the pivoting tray 4 and the device for controlling the positioning and retraction of the rotary blade which will be described in detail below. These two devices are located beneath the floor 2 and are therefore not shown in FIG. 1. They are connected via the above-mentioned drive chain 16 to a motor 6, assisted by a reduction box 7, which are not shown in FIG. 1 owing to the lay-out of the cutting arrangement (see below). The two devices and their drive are shown in detail in FIG. 2 which does not take into consideration the presence of the floor 2.

Figure 4:
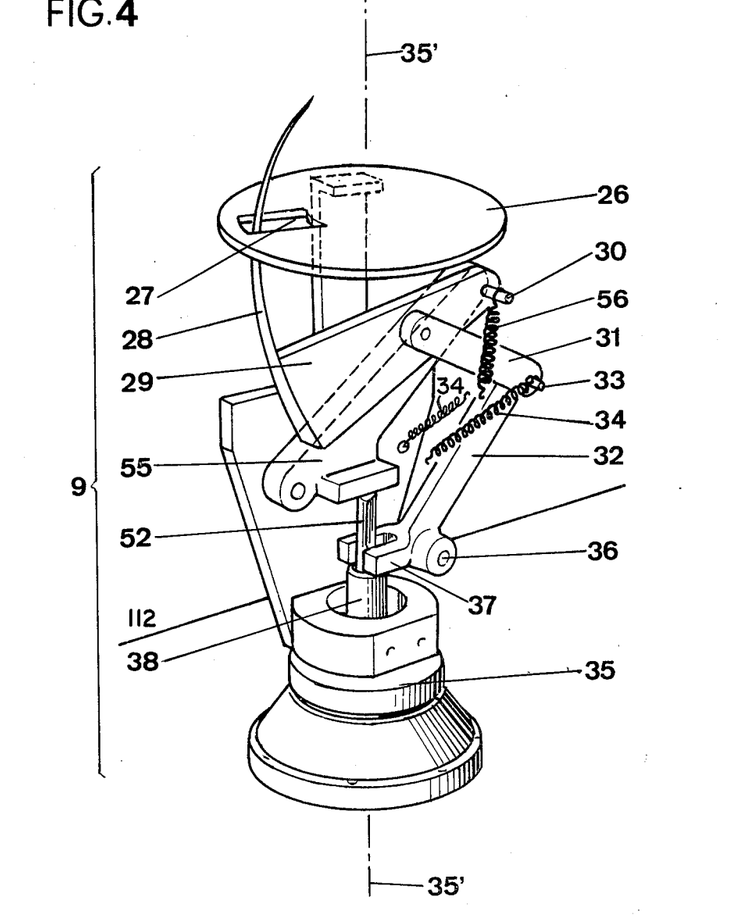
FIG. 4 is a view which shows the cutting arrangement (with the exception of one of its two cheeks) with the device for positioning and for retracting and the device for the radial adjustment of the blade.

FIG. 1 shows a second motor 8, without a reduction box, which drives the shaft of a cutting arrangement 9 (shown in part) by means of a belt. FIG. 4 shows the cutting arrangement 9 in detail.

Finally, a device is connected to the axle of the cutting arrangement 9 for detecting the size of the cauliflower and for adjusting the radial position of the blade to the diameter of the stalks of the cauliflower. This device is shown in part in FIG. 1. It is illustrated in detail in FIG. 5.

In the description below, each of the devices is described separately in detail. Finally, the synchronisation of the movements of all of these devices will be described so as to reconstitute a general view.

Device for discontinuously rotating the pivoting tray

Figure 2:
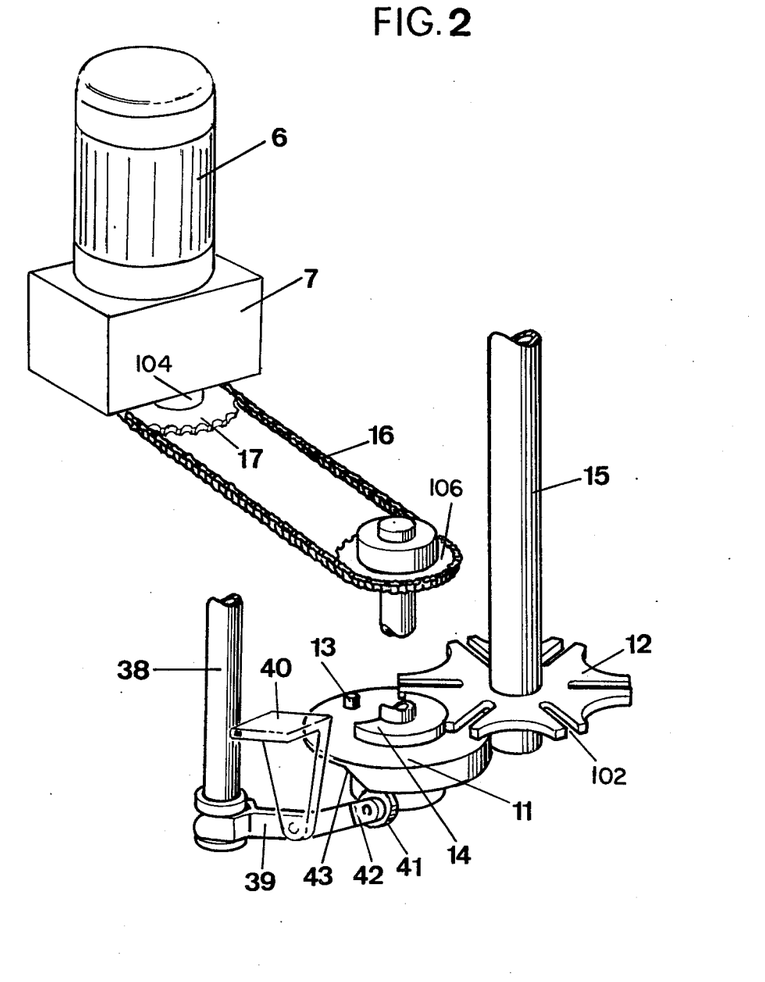
FIG. 2 is a view which shows the device for discontinuously rotating the pivoting tray and the device for controlling the retraction and for installing the cutting blade, in a partial section.

The cauliflower head placed in a recess 5 is to come to rest above the cutting arrangement 9, that is to say in cutting position 5". In the preferred embodiment described herein, the tray 4 has six recesses 5. Thus the rotational movement imparted to the disc 11 is converted into intermittent rotational movement so that the plate 12 comes to rest after each sixth of a complete rotation. As shown in FIG. 2, the disc 11 has a pin 13 arranged on its upper face near to its circumference. It is also provided with a concentric locking cam 14 of smaller diameter. An arc-shaped cut-out part opposite the pin 13 cuts into the periphery of the cam 14 which is circular elsewhere. The plate 12 forming an integral part of the axle 15 of the pivoting tray 4 has six branches each of which is slit radially so as to receive the pin 13. The portion between the branches forms an arc of a circle of equal diameter to that of the cam 14.

In operation the pin 13 lodges in one of the slots 102 in the plate 12, is pushed to the bottom thereof by the rotation of the disc 11 and causes the plate 12 to pivot by a sixth of a turn until it is released from the slot again; the cam 14 then blocks the plate 12 in the operating position with the circular portion of its periphery resting against the portion between a branch of the plate 12. FIG. 2 shows this blocking position. The same operation is repeated when the disc 11 has performed a complete rotation and the pin 13 is opposite the slot of the subsequent branch. This type of drive is sometimes known as "Geneva motion".

In the embodiment shown in FIG. 2, the disc 11 is driven by a chain 16 connected to a wheel 17 forming an integral part of the shaft 104 of the motor 6, essentially as a result of the arrangement of the bodies in the limited space of the machine. The reduction obtained in the box 7 may be increased by suitable selection of the respective diameters of the chain wheel 17 and of the wheel 106 driving the disc 11.

Figure 3:
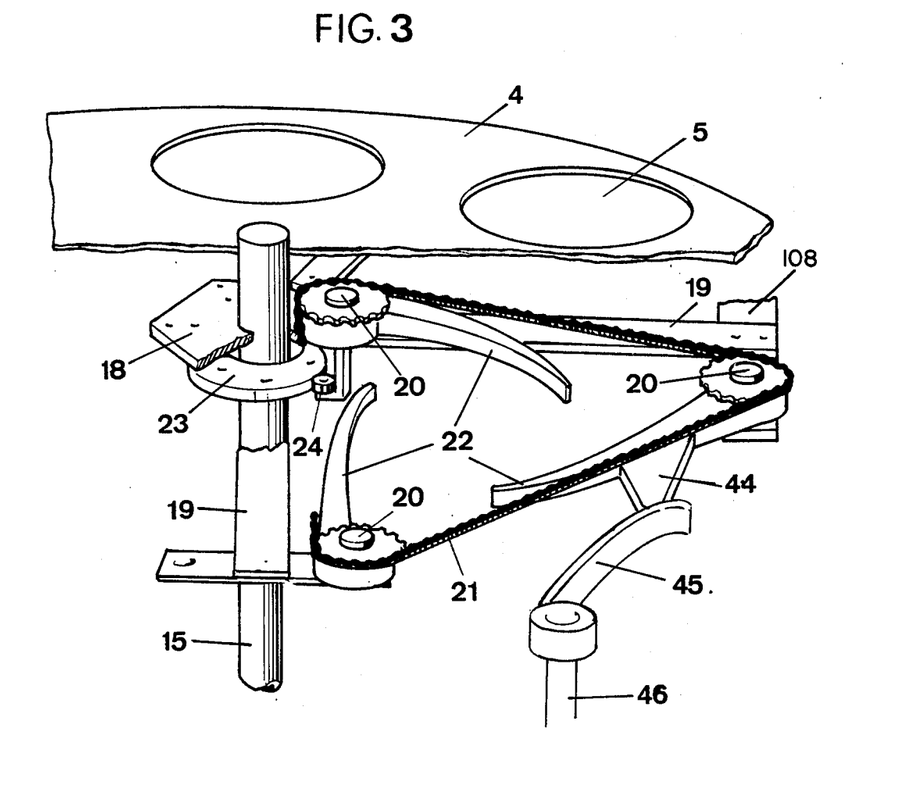
FIG. 3 is a view which shows the device for fixing the cauliflower heads in the cutting position as seen from the back left-hand corner in FIG. 1.

Device for fixing the cauliflower heads in the recesses of the pivoting tray The shaft 15 supports a plate 18 placed between the stationary table 3 and the pivoting tray 4, as shown in FIG. 3. The body of the plate 18 is provided with six arms 19 arranged in the manner of spokes between the spaces left by the recesses 5. These arms 19 each terminate with a transversal bar 108 making them T-shaped when viewed from above. Pivots 20 are arranged at each end of the said transversal bar and also on the body of the plate 18 between the bases of two adjacent arms. There are thus three pivots forming an equilateral triangle beneath each recess 5. Six chains 21 each join up three pivots forming such a triangle between them. Each of these pivots 20 is provided with an arm 22 which is curved inwards and downwards so as to match the round shape of a cauliflower head. Beneath the plate 18, the shaft 15 is surrounded by a cam 23 fixed on the table 3 (not shown) the bulge of which is opposite the spaces of the recesses located in the position where the recess has to have the cut cauliflower removed (5''') and be provided with a fresh cauliflower head (5') respectively.

Fixed on the shaft 15, the plates 4 and 18 advance simultaneously and intermittently by a sixth of a turn. In our example, these plates rotate in an anti-clockwise direction. When an internal pivot 20, in other words a pivot placed on the body of the plate 18, is placed opposite the bulge of the cam 23, a roller 24 fixed on an arm forming part of the axle of the pivot 20 imparts to this pivot a rotational movement which the pivot transmits by means of the chain 21 to two external pivots 20 with which it forms a triangle. The rotational movement causes the arms 22 to move apart so as to release the cauliflower head placed therein or so as to allow a fresh cauliflower head to be inserted. All or some of the pivots 20 forming a triangle are provided with a spring (not shown) to allow them to close their arms on the cauliflower head 25 in the manner of claws as soon as the internal pivot 20 has passed the bulge of the cam 23.

The number of arms 22 is not limited to three and, as a variation, the ends of the arms are provided with elastic parts which improve contact with the cauliflower.

The embodiment with six recesses 5 selected in this case allows for rational utilisation of the space available on a circular tray such as the tray 4 and imparts to the machine a rhythm to which the operator can easily insert a fresh cauliflower head into each recess 5 at the feed position 5'.

Of course, it is possible to increase the number of recesses 5 so as to obtain a higher output with the machine. In this case, the disc would perform a rotation of less than one sixth of a turn during each operation and the tray 4 would have to be of larger diameter. On the other hand, a machine which has been simplified to the extreme would only contain one recess 5 pivoting without transition from the cutting position 5'' to the feed position 5' where the operator would insert a new cauliflower head after having removed the cut stalks and flowers from the preceding recess.

Device for positioning and retracting the cutting blade

As shown in FIG. 4, a small rotating plate 26 driven by the cutting arrangement 9 is embedded in the stationary table 3. This plate 26 is provided with a rectangular orifice 27 closed by a slide (not shown, but which, e.g., could be a torsion spring received on the point and fixed to transversed bar 108) through which the blade 28 passes and which follows the radial movement of the blade 28. The blade 28 forms an integral part of a sector 29 turning about a pivot 30. A connecting rod 31 joins the sector 29 to the upper end of a lever 32 owing to the axle 33. A spring 34 stretched between one of the cheeks (not shown, whereas the other cheek 112 and a fragment of its associated spring 34 are shown) of the cutting arrangement 9 and the axis 33 forces the axle 33 to come back towards the axis 35' of the cutting arrangement 9. The lower end of the lever 32 is fixed to a pivot 36 forming an integral part of the body of the cutting arrangement 9. It is extended by a fork 37 which forms an open angle with the upper face of the lever 32.

The fork 37 comes to rest against a rod 38. This rod is concentric to the shaft 35 but is of smaller diameter and passes through the shaft 35 from top to bottom with its lower end projecting beyond that of the shaft 35.

As shown in FIG. 2, a lever 39 pivots about a bearing 40 fixed on the lower face of the floor 2 (see FIG. 1). One of the arms of the lever 39 rests against the lower end of the rod 38; the other arm is provided with a roller 41 fixed in a fork 42 and rolling over a cam 43 placed in the manner of a rim on the lower face of the disc 11 (provided with pin 13 and cam 14 on its upper face). As shown in FIG. 2, the cam 43 is arranged in relation to the pin 13 and the peg 14 so that it forces the roller 41 to remain lowered from the moment when the cam 14 engages in the slot of an arm of the plate 12 until the moment when it is released, that is to say for the duration of the pivoting of the tray 4.

When the roller 41 is lowered, the rod 38 is pushed upwards and transmits the movement to the fork 37. As a result, (cf. FIG. 4) the lever 32 pivots in a clockwise direction, driving the sector 29 downwards. Consequently the cutting blade 28 disappears in the orifice of the small rotating plate 26, (retracted position). On the other hand, when the roller 41 comes to rest at the bottom point of the cam 43, the lever 39 allows the rod 38 to descend again and the spring 34 pulls the axle 33 towards the axis 35' thus forcing the sector 29 to rise again. The cutting blade 28 springs out of the orifice 27 (positioning of the blade).

Device for detecting the size of the cauliflowers and for the radial adjustment of the cutting blade As shown in FIG. 3, when the plate 18 is rotated, a nose 44 forming an integral part of the first of the external arms 22 of each of the claws makes contact with a tongue 45 forming an integral part of a shaft 46 and located slightly in front of the cutting position 5", taking into consideration the rotational direction of the plate 18.

In an embodiment which is not shown, the tongue 45 is located even further forward, the nose 44 being arranged on the pivot 20 of the second of the external arms 22. The object to be achieved in each case is to measure the size of the cauliflower head 25 at the latest when it reaches the cutting position 5".

It is obvious that the nose 44 will clearly project beyond the circumference of the circle described by the arms 19 when the arms 22 close on a large cauliflower head 25 and that, inversely, the nose will hardly project beyond that circumference for a small cauliflower head 25. The nose 44 will thus displace the tongue 45 to a greater or lesser extent depending upon the size of the cauliflower head 25.

Figure 5:
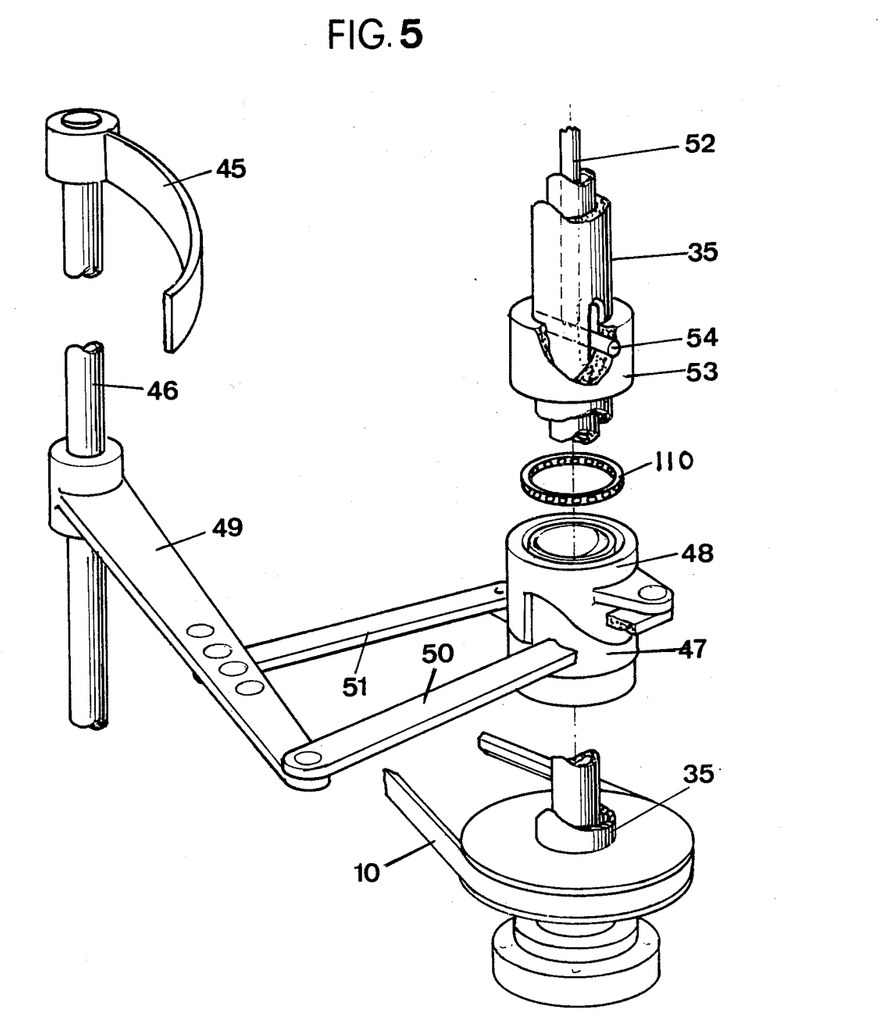
FIG. 5 is a view which shows the device for controlling the radial adjustment of the blade partially exploded in a partial perspective section.

As shown in FIG. 5, the movement of the tongue 45 is transmitted via the shaft 46 to a differential cam formed by a cam 47 and a counter-cam 48 by means of an arm 49 and connecting rods 50, 51. When the arm 49 moves away from the shaft 35 (large cauliflower 25), the connecting rod 50 which is hinged to one of the lateral faces of the cam 47 causes the cam to rotate. The counter-cam 48 is simultaneously rotated in the opposite direction since the connecting rod 51 is connected to the lateral face of the counter-cam on the side opposite that of the connecting rod 50. As a result, the counter-cam 48 moves towards the cam 47; it reaches the highest point (maximum distance apart) for an exceptionally large cauliflower head 25 and the lowest point for a small cauliflower head; since the body of the cam 47 is kept at a constant height, the distance of the counter-cam 48 is interpreted as a rise of the latter. In other words, the differential cam assembly involves an operation in which rod 50 is attached to lever 120 of counter-cam 48 and rod 51 to lever 122 of cam 47. When swivelling, lever 49 pushes or pulls the rods 50 and 51 and therefore, cams 47 and 48 rotate in opposite directions, which raises or lowers counter-cam 48 and hence rod 52.

The rising motion of the counter-cam 48 surrounding the shaft 35 must be transmitted to the rod 52 which is also concentric with the shaft 35 but shorter than the shaft 35 and has an even smaller diameter than that of the rod 38 which surrounds it. Transmission is effected in the following manner, in the example shown in FIG. 5: a sleeve 53 is placed on the counter-cam 48 by means of ball bearings 110. Although it is free to rotate in relation to the counter-cam 48, it is compelled to follow the movements thereof in the axial direction. It has a pin 54 on its internal face and this pin reaches the lower end of the rod 52 through two slots, one of which is made in the wall of the shaft 35 and the other in the hollow upper part of the wall of the rod 38. These slots, which are extended in the vertical direction, absorb the rising and lowering movements which the pin 54 has to transmit to the single rod 52. In the example described herein, the sleeve 53 forms an integral part of the shaft 35 so that the pin 54 placed in the slots of the shaft 35 follows the rotational movement of the shaft 35 without rubbing. Similarly, the rod 38 is activated by the pin 54 in a rotational movement, even though such a movement is by no means indispensible to its functioning (described above).

The fork 37 affords a passage for the rod 52 which is extended beyond the upper end of the rod 38, as shown in FIG. 4. The upper end of the rod 52 rests against the shoe of a lever 55 whose lower end pivots over the body of the cutting arrangement 9. The upper end of this lever 55 supports the pivot 30 with the sector 29; a spring 56 is stretched between the pivot 30 and the upper rim of the cutting arrangement 9. The positioning and retracting movements on the one hand and the radial adjustment on the other hand are dependent upon each other and the cutting blade 28 is guided by the combined effect of the two devices. A distinction has only been made for the sake of clarity in the text.

On the other hand, during operation a braking device (not shown) keeps the cutting blade in the position determined by the size of the cauliflower.

When the lever 55 is raised by the rod 52, the pivot 30 moves towards the axis 35', this movement describing an arc of a circle round the lower end of the lever 55 and being adapted to extend beyond the said axis 35'. This results in an increase in the distance separating the axis 35' from the furthest point of the arc of a circle described by the cutting blade 28; on the other hand, when the rod 52 is lowered, the cutting blade 28 approaches the axis 35'. It is true that for a given position of the lever 32, the rise of the lever 55 causes a simultaneous fall of the sector 29 which is constrained by the connecting rod 31 pivoting about the fixed point thus formed by the upper end of the lever 32.

Other embodiments of the device for detecting the size of the cauliflowers and for the radial adjustment of the cutting blade 28 are feasible. In particular, in one embodiment (not shown) the rod 52 for controlling the radial adjustment is hollow and of a larger diameter than the rod 38 which it surrounds with its walls. It has a space in its upper portion allowing a spur to perform freely the to and fro movement imparted to it by the rod 38. This rod is obviously extended beyond the lower end of the rod 52 to the lever 39 as in the embodiment described above. The advantage over the embodiment shown particularly in FIG. 5 is that the pin 54 inside the sleeve 53 only passes through the wall of the rod 38 in order to come to rest against the lower end of the rod 52 and that the rod 38 does not therefore perform rotational movements.

The idea of the invention will not be harmed by substituting an electronic device for detecting the size of the cauliflowers for the mechanical devices described above. Thus, the deviation of the tongue 45 could be transmitted, in an embodiment which is not shown, to a calculator controlling the radial adjustment of the cutting blade 28 via, for example, a micro-motor housed in the cutting arrangement 9. In an embodiment which is not shown, the size of the cauliflower heads is measured by a photoelectric cell replacing the tongue 45 and transmitting its information to the calculator.

Synchronisation of the movements of all of the devices

The preferred embodiment shown in the drawings functions as follows

The disc 11 begins to move when the motor 6 is started up. As shown in FIG. 2, the pin 13 moves the plate 12. This plate 12 is blocked by the cam 14 when one of the recesses 5 provided in the pivoting tray 4 is located in the feed position 5' shown in FIG. 1.

The operator then places a first head of cauliflower in the space in this recess with its point uppermost.

The pivoting tray 4 is then driven in the manner described in a rotational movement of one sixth of a turn in an anti-clockwise direction; another recess 5 comes to rest in the feed position 5'.

As shown in FIGS. 1 and 3, the arms 22 then close over the head of cauliflower 25 as a result of the action of the springs (not shown) of the pivots 20 when the cam 23 stops acting upon the internal pivot 20; in fact, the roller 24 loses contact with the cam 23. The head cauliflower 25 is thus centered then held firmly by the arms 22.

When leaving the feed position 5', the recess 5 provided with a head of cauliflower carries out four movements, each of one sixth of a turn, before reaching the cutting position 5". At this point, the bottom of the head of cauliflower 25 slides on the smooth upper surface of the stationary table 3.

Just before the recess 5 reaches the cutting position 5", the nose 44 knocks against the tongue 45 and causes it to deviate (cf. FIG. 3). This movement is transmitted in the manner described above (see also FIG. 5) to the differential cam 47/48 and thence to the cutting blade 28 as shown in FIG. 4. The shoe of the lever 55 constantly rests on the end of the rod 52; the spring 56 forces it to follow a lowering movement thereof; the force of traction of the spring 56 is not compensated by that of the spring 34 for the reason given below. Furthermore, the cam 43 shown in FIG. 2 causes the rod 38 to rise and thus causes the retraction of the cutting blade 28 on this side of the orifice 27 each time that the pivoting tray 4 and the device for fixing the heads of cauliflower rotate. As a result, the fork 37 rests on the end of the rod 38 controlling the retracting movement while the cutting blade 28 is adjusted radially. In other words, the upper end of the lever 32 constitutes a fixed point allowing the lever 55 which is raised by the rod 52 to displace the pivot 30 so as to adjust the radial position of the cutting blade 28 to the size of the head of cauliflower 25.

At this moment, the head of cauliflower 25 has finished reaching the cutting position 5". Held firmly by the arms 22, the head of cauliflower 25 is then placed on the small rotating plate 26 embedded in the stationary table 3.

At this exact moment the roller 41 (see FIG. 2) leaves the ramp of the cam 43; the lever 39 allows the rod 38 to descend from then on.

Since the pivot 30 is blocked in the position given by the rod 52 and the lever 55, the spring 34 causes the cutting blade 28 to spring out of the orifice 27. The blade is curved so as to adopt the shape of the stalks of the cauliflower and is thus placed between the stalks and the flowers of the head of cauliflower 25.

The second motor 8 starts up at this moment at the latest. In practice, this motor is started up substantially at the same time as the motor 6 and does not interrupt its work during the rotational movements of the pivoting tray 4. The driving belt 10 transmits a rapid rotational movement to the shaft 34, to the rotary cutting arrangement 9 and to the assembly of levers and connecting rods supporting the cutting blade 28 as well as to the small rotating plate 26 provided with the orifice 27 for the passage of the cutting blade 28.

In a complete turn, the cutting blade 28 has separated the entire flower from the stalks without harming it. The cutting blade 28 is thus ready to retract again through the orifice 27; this movement is performed at the moment when the roller 41 re-engages in the ramp of the cam 43 and causes the rod 38 to rise.

This movement is followed by the rotational movement of one sixth of a turn of the pivoting tray 4. The recess 5 thus reaches the discharge position 5'". The arms 22 are open at this position as a result of the action of the cam 23. The separated stalks and flowers are discharged through an orifice (not shown) in the stationary table 3 and are then transported by a conveyor belt to a sieve which separates the stalks from the flowers of smaller size.

The next rotational movement brings the pivoting tray 4 to the feed position 5'.

We claim:

1. A machine for paring products such as vegetables, fruits or parts thereof having as their base a central portion to be separated over a hemispherical or ogival surface from the surrounding portion, said machine comprising a tray which is provided with one or more recesses in which the product can be received, means for supporting said tray for rotation about a fixed axis, said recess being adapted to hold said product in a position in which its major axis is parallel to said fixed axis, means for intermittently rotating said tray to move said recess from a product receiving station to a paring station, a curved paring blade, means for effecting relative rotation between said paring blade and said product when the latter is positioned at the paring station to separate said hemispherical or ogival surface from said surrounding portion, means for advancing said paring blade into said recess and out of said recess, said means including a rod engageable with said paring blade and moveable along an axis codirectional with that of said product major axis whereby said paring blade moves between advanced and retracted position in an arc convex in relation to said major axis, and means for adjusting the length of paring blade advance into said recess, said adjusting means including a lever supported for pivoting movement, said paring blade being connected to said lever, a second rod strokable in opposite directions along an axis parallel to said major axis, linkage connected with said lever, said second rod being engageable with said linkage, and a differential cam connected with said second rod for controlling the stroke thereof.

2. A machine in accordance with claim 1 further comprising a tongue engageable with said product when said product is at said paring station, said tongue detecting the size of said product and being operatively connected with said adjusting means for controlling the advance of said paring blade into said recess in correspondence with the size of said product.

3. A machine in accordance with claim 1, in which said paring blade is of sufficient length to provide that its top end intersects said major axis when said blade is advanced into said recess.

4. A machine in accordance with claim 1 further comprising a rotatable plate encircled by said recess on said tray, said product being received on said rotatable plate, said rotatable plate having a slotted opening through which said paring blade passes when said paring blade is advanced into and retracted from said recess.

5. A machine in accordance with claim 1 in which the means for rotating said tray includes a rotary disc having a pin and a cam on one face thereof, a slotted plate connected to said tray, said pin engaging in slots in said plate for rotating said slotted plate, the other face of said rotary disc constituting a further cam, and a follower engaged with said further cam and connected to said second rod for stroking same.

6. A machine in accordance with claim 2, in which each said recess is surrounded by arms fixed on pivots and which are operatively interconnected with each other for engaging and holding the product received in said recess.

7. A machine in accordance with claim 6, in which at least one of said arms carries a projection, said projection engaging said tongue.

8. A machine in accordance with claim 6, in which said arms are interconnected by a chain, there being means associated with at least one of said arms for rotating said one arm to move it into contact with said product, rotation of said one arm causing said chain to rotate and pivot the remaining arms into contact with said product.

* * * * *